US012337334B2

(12) United States Patent
Pekarek

(10) Patent No.: US 12,337,334 B2
(45) Date of Patent: Jun. 24, 2025

(54) SEALING STATION WITH CENTRIFUGAL SEPARATOR

(71) Applicant: MULTIVAC SEPP HAGGENMUELLER SE & CO. KG, Wolfertschwenden (DE)

(72) Inventor: Nikolas Pekarek, Kempten (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 770 days.

(21) Appl. No.: 17/557,864

(22) Filed: Dec. 21, 2021

(65) Prior Publication Data

US 2022/0193696 A1 Jun. 23, 2022

(30) Foreign Application Priority Data

Dec. 23, 2020 (DE) ........................ 102020134811.8

(51) Int. Cl.

*B04B 3/00* (2006.01)
*B04B 11/00* (2006.01)
*B65B 31/02* (2006.01)

(52) U.S. Cl.

CPC ................ *B04B 3/00* (2013.01); *B04B 11/00* (2013.01); *B65B 31/028* (2013.01)

(58) Field of Classification Search

CPC ......... B04B 3/00; B04B 11/00; B65B 31/028; B65B 51/14; B65B 7/164; B65B 11/50; B65B 31/02; B65B 61/06

See application file for complete search history.

(56) References Cited

U.S. PATENT DOCUMENTS

| | | | |
|---|---|---|---|
| 2,609,134 | A | 9/1952 | Korber |
| 5,344,662 | A | 9/1994 | Payne et al. |
| 5,570,628 | A | 11/1996 | Kiener et al. |
| 9,481,480 | B2 | 11/2016 | Harlacher et al. |
| 2004/0244593 | A1 | 12/2004 | Tomek |
| 2005/0076616 | A1 | 4/2005 | Bassett et al. |

(Continued)

FOREIGN PATENT DOCUMENTS

| | | | |
|---|---|---|---|
| CN | 1568215 | A | 1/2005 |
| CN | 101855139 | A | 10/2010 |
| CN | 103318448 | A | 9/2013 |

(Continued)

OTHER PUBLICATIONS

German Search Report dated Aug. 19, 2021, Application No. 10 2020 134 811.8, Applicant MULTIVAC Sepp Haggenmueller SE & Co. KG, 4 Pages.

(Continued)

*Primary Examiner* — Krishnan S Menon
*Assistant Examiner* — Shuyi S. Liu
(74) *Attorney, Agent, or Firm* — BROOKS KUSHMAN P.C.

(57) ABSTRACT

The disclosure relates to a sealing tool for a packaging machine which comprises a tool lower part with at least one centrifugal separator for separating a particle-laden gas flow. The disclosure further relates to a method for separating a particle-laden gas flow at a sealing tool of a packaging machine, where the particle-laden gas flow is separated by way of a centrifugal separator provided at a tool lower part of the sealing tool.

20 Claims, 5 Drawing Sheets

(56) References Cited

U.S. PATENT DOCUMENTS

2020/0346803 A1 11/2020 Mader et al.

FOREIGN PATENT DOCUMENTS

| | | | | | |
|---|---|---|---|---|---|
| CN | 203664203 | U | * | 6/2014 | |
| CN | 219003396 | U | * | 5/2023 | ............ Y02W 30/62 |
| DE | 246745 | A1 | | 6/1987 | |
| DE | 102009036183 | A1 | * | 2/2011 | ............ B65B 35/18 |
| EP | 3 733 536 | A1 | | 11/2020 | |

OTHER PUBLICATIONS

Chinese Office Action and Search Report, Patent Application No. 202111585059.8, Applicant: MULTIVAC Sepp Haggenmuller SE & Co. KG, dated Mar. 22, 2024 (with English machine translation) (15 pages).
Fan, Exploring the Mechanism and Improvement of Methods of Powder Pollution Packaging Sealing, Food Safety Guide, Issue 16, Jun. 5, 2018 (with English machine translation) (12 pages).
Liao et al., Experimental Research and Analysis of Square Separator, Power Plant System Engineering, Issue 3, May 22, 2003 (with English machine translation) (9 pages).
European Search Report (with English Machine Translation) Dated Apr. 12, 2022, Application No. 21204893.8-1014, Applicant MULTIVAC Sepp Haggenmueller SE & Co. KG, 12 Pages.

* cited by examiner

SEALING STATION WITH CENTRIFUGAL SEPARATOR

CROSS-REFERENCE TO RELATED APPLICATIONS

This application claims foreign priority benefits under 35 U.S.C. § 119(a)-(d) to German patent application number DE 10 2020 134 811.8, filed Dec. 23, 2020, which is incorporated by reference in its entirety.

TECHNICAL FIELD

The present disclosure relates to a sealing station for a packaging machine. Furthermore, the disclosure relates to a method for separating a particle-laden gas flow at a sealing tool of a packaging machine.

BACKGROUND

In practice, deep-drawing packaging machines and tray sealers are used to produce sealed packages. A sealing station can be used at such machines to seal with a top film unsealed deep-drawn depressions or prefabricated tray elements, respectively, that it is supplied. For this purpose, the sealing station comprises a tool lower part and a tool upper part which can form a hermetically sealable chamber in which, prior to sealing with the top film dispensed from a top film receptacle, the atmosphere in the deep-drawn depressions or in the tray elements can be evacuated and/or can be replaced with a gas mixture by gas flushing with, for example, a replacement gas.

For example, EP 3 733 536 A1 discloses a sealing station with a tool lower part configured for atmosphere exchange.

In the case of atmosphere exchange, in particular if the air in the packaging is optionally extracted by way of a vacuum and replaced with a preset gas mixture, however, it can happen in particular when packaging products with loose components on the product surface, for example, with products coated with breading or herbs, that individual components are blown out of the packaging and that the extraction ducts of the tool lower part are contaminated as a result. Contaminated extraction ducts have to be cleaned regularly and lead to considerable machine downtimes.

Though the extraction ducts mentioned above do not exist in tools that are configured exclusively for gas purging, loose product components, for example, breading, herbs, etc., are then blown directly into the machine space and then contaminate the machine region used for food packaging.

SUMMARY

An object of the disclosure is to provide a sealing tool for a packaging machine with which the drawbacks described above in connection with known tools can be eliminated. It is furthermore the object of the disclosure to provide a corresponding method.

The disclosure relates to a sealing tool for a packaging machine, for example, a deep-drawing packaging machine or a tray sealer. According to the disclosure, the sealing tool comprises a tool lower part with at least one centrifugal separator for separating a particle-laden gas flow.

The centrifugal separator provided according to the disclosure at the tool lower part ensures that the product particles that may be whirled up during an atmosphere exchange, for example, breading or herb particles, can substantially be filtered out of the atmosphere, i.e., from the gas flow generated within the sealing tool. This prevents the particles released from the product from spreading inside the sealing tool, i.e., outside its packaging. As a result, the centrifugal separator can effectively counteract contamination of the sealing tool. In particular, this makes it possible to reduce the cleaning intervals required at the packaging machine due to the accumulation of particles, which leads to lower machine downtimes.

It is advantageous to have the centrifugal separator be configured as a tangential cyclone separator. It forms a simple technical measure that can be implemented in an inexpensive manner at the tool lower part. Separating a gas flow that is potentially laden with particles using a tangential cyclone separator into particles and pure gas is possible in a tight installation space, i.e., it is predestined for a multifunctional tool lower part.

The centrifugal separator preferably comprises an inlet cylinder and an inlet which tapers towards the inlet cylinder. This makes it possible for a large volume flow of the gas flow to be captured and be directed precisely to the centrifugal separator. The inlet which tapers towards the inlet cylinder further provides a jet effect, whereby the particle-laden gas flow can be accelerated into the inlet cylinder so that the particles can be better separated from the gas flow due to the increased centrifugal forces acting upon them.

An advantageous variant provides that the inlet is associated with a tray receptacle of the tool lower part. The centrifugal separator is then positioned with its inlet in the immediate vicinity of the product and is open there toward so that any particles that may be whirled up can be easily captured due to the suction effect of the centrifugal separator.

The tool lower part preferably comprises at least one extraction duct and/or at least one gas flushing duct. The extraction duct can be used to generate a vacuum inside the sealing tool, i.e., inside a chamber thereon that can be closed. It is conceivable to have the extraction duct and the centrifugal separator be present as separate components or be designed as an integral functional unit at the tool lower part. In a separate embodiment, the centrifugal separator could be positioned directly adjacent to the extraction duct, in particular adjacent to an extraction opening formed thereon. As an integral functional unit, the centrifugal separator could be formed directly at the inlet of the extraction duct.

In particular, it is advantageous to provide the centrifugal separator closer to the extraction duct than to the gas flushing duct, in particular to a gas flush opening formed thereon. For example, the centrifugal separator and the extraction duct could be formed together on a side of the tool lower part that is disposed opposite to another side of the tool lower part on which one or more gas flush openings are formed.

It would be conceivable to have all extraction ducts, that can be used at the tool lower part for atmosphere exchange, comprise a centrifugal separator at the inlets formed on the former, meaning at all extraction openings. This means that the air mass extracted from the sealing tool can be cleaned completely.

According to an advantageous embodiment, the tool lower part comprises a particle collection container for the centrifugal separator. Received therein can be the particles separated from the air or from the gas flow by use of the centrifugal separator within the sealing tool. It can be easily emptied and cleaned in a short time. The particle collection container provides a central collection point for the particles to which the particles can be fed in a controlled manner.

It is conceivable that the tool lower part comprises a filling level indicator for the particle collection container. The tool lower part preferably comprises a window, for example, a transparent wall, which enables an operator to look into the interior of the particle collection container.

It would be possible for the tool lower part to comprise several centrifugal separators. They can be functionally connected to one another or can be driven individually, for example, by way of a valve device provided for this purpose. In particular, the centrifugal separators can be arranged adjacent to one another along one side of the tool lower part to which the gas flow is directed during an atmosphere exchange. This has the effect that the potentially particle-laden gas flow enters the inlet region of the centrifugal separator(s) in its direction of flow, i.e., without being deflected at that time, which promotes the removal of the particles contained therein.

The centrifugal separator at the tool lower part is preferably configured for separating a particle-laden gas flow that is blown through the former and/or for separating a particle-laden gas flow that is sucked into the former. The centrifugal separator can then be used during a gas flushing process and/or during an evacuation of the sealing tool.

The centrifugal separator can preferably be connected to a pump that can be employed at the tool lower part for atmosphere exchange. The centrifugal separator can be connected at least temporarily, for example, during predetermined evacuation intervals, for example, to the pump that can be employed for an evacuation process at the sealing tool. It is conceivable to have the centrifugal separator be operatable permanently while the sealing tool is in operation in order to continuously extract the particles flying around from its surroundings.

A preferred variant provides that the tool lower part be assembled from several plates disposed one above the other in a stack-like manner, where the centrifugal separator is formed to be integrated within at least two plates that are disposed one above the other. With such a sandwich structure, the centrifugal separator can be produced inexpensively at the tool lower part.

The centrifugal separator preferably comprise a cylindrical insert built into the tool lower part and having a conical separation section for the particle-laden gas flow. Such an insert member can be produced separately and inexpensively and can subsequently be installed as a component at the tool lower part without any problems.

The disclosure also relates to a packaging machine which is present in particular in the form of a deep-drawing packaging machine or in the form of a tray sealer, where the packaging machine comprises at least one sealing tool with a centrifugal separator for separating a particle-laden gas flow.

The disclosure further relates to a method for separating a particle-laden gas flow at a sealing tool of a packaging machine, where the particle-laden gas flow is by way of a centrifugal separator provided at a tool lower part of the sealing tool. This can prevent any particles whirled up during an atmosphere exchange process that is carried out at the sealing tool, for example, breading particles, herb flakes, or the like, from contaminating the sealing tool, in particular extraction ducts provided thereon. The centrifugal separator thus promotes operation that meets the highest hygienic standards.

The centrifugal separator is preferably operated with a pump that is employed at the tool lower part for atmosphere exchange. For example, a pump used for an evacuation process at the sealing tool can simultaneously be functionally connected to the centrifugal separator, i.e., during evacuation, and/or during a subsequent process, for example, during a gas flushing process.

It is conceivable to have the centrifugal separator be operated with a pressure vessel that can be employed at the tool lower part for atmosphere exchange. For example, such a pressure vessel can flush replacement gas into the sealing tool, in particular into a chamber therein previously evacuated, where the gas flow thus generated within the sealing tool is at least in part blown through the centrifugal separator so that any particles possibly contained therein remain in the centrifugal separator.

BRIEF DESCRIPTION OF THE DRAWINGS

The disclosure shall be explained in more detail according to the following figures by use of embodiments, where.

Same components are provided with the same reference numerals throughout the figures.

DETAILED DESCRIPTION

Figure 1:
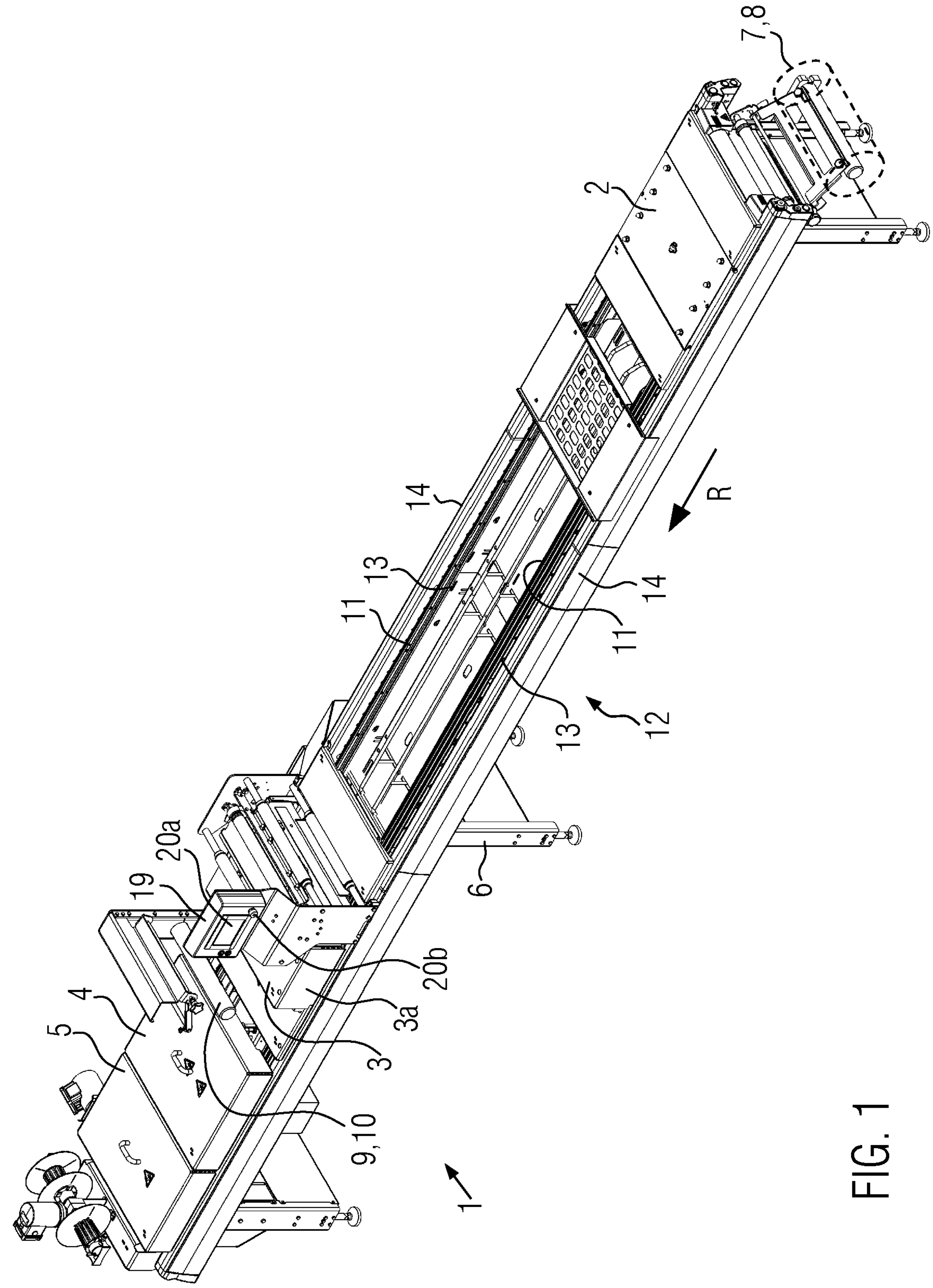
FIG. 1 shows a perspective view of a deep-drawing packaging machine.

FIG. 1 shows an intermittently operating deep-drawing packaging machine 1 in a perspective view. This thermoforming packaging machine 1 comprises a forming station 2, a sealing station 3, a transverse cutting device 4, and a longitudinal cutting device 5 which are arranged in a direction of transport R in this order on a machine frame 6. Disposed at the inlet side on machine frame 6 is a feed roller 7 from which a base film 8 is drawn off. Furthermore, deep-drawing packaging machine 1 comprises a transport chain 11, which grips base film 8 and transports it onward in direction of transport R with every main work cycle, in particular transport chains or clamp chains 11 arranged on both sides.

In the embodiment shown, forming station 2 is configured as a deep-drawing station in which depressions are formed into base film 8 by deep drawing, for example, by way of compressed air and/or vacuum. Forming station 2 can be configured such that several depressions are formed adjacent to one another in the direction perpendicular to direction of transport R. Provided in direction of transport R downstream of the forming station is a filling stretch 12 in which the depressions formed in base film 8 are filled with products.

Sealing station 3 comprises a hermetically sealable chamber **3*a* in which the atmosphere in the depressions can be evacuated and/or replaced by gas flushing with an exchange gas or with a gas mixture prior to the sealing process with top film 10 that is dispensed from a top film receptacle 9**.

Transverse cutting device 4 can be configured as a punch which severs base film 8 and top film 10 in a direction transverse to direction of transport R between adjacent depressions. Transverse cutting device 4 operates in such a way that base film 8 is cut open not over the entire width, but is instead not severed at least in one edge region. This enables controlled onward transportation by transport chain 11.

Longitudinal cutting device 5 can be configured as a knife assembly with which base film 8 and top film 10 are severed between adjacent depressions and at the lateral edge of base film 8 in direction of transport R so that individual packages are present downstream of longitudinal cutting device 5.

Right and left transport chains 11 of deep-drawing packaging machine 1, which grip base film 8 on both sides, are each guided in a chain guide 13. These chain guides 13 are each protected towards the outside by a side panel 14 of deep-drawing packaging machine 1 and possibly attached to side panel 14. Side panel 14 can be a sheet metal part.

Deep-drawing packaging machine 1 also comprises a control device 19. Its task is to control and monitor the processes running in deep-drawing packaging machine 1. A display device 20*a* with control elements 20*b* is used to visualize or influence the process sequences in deep-drawing packaging machine 1 to or by an operator.

Figure 2:
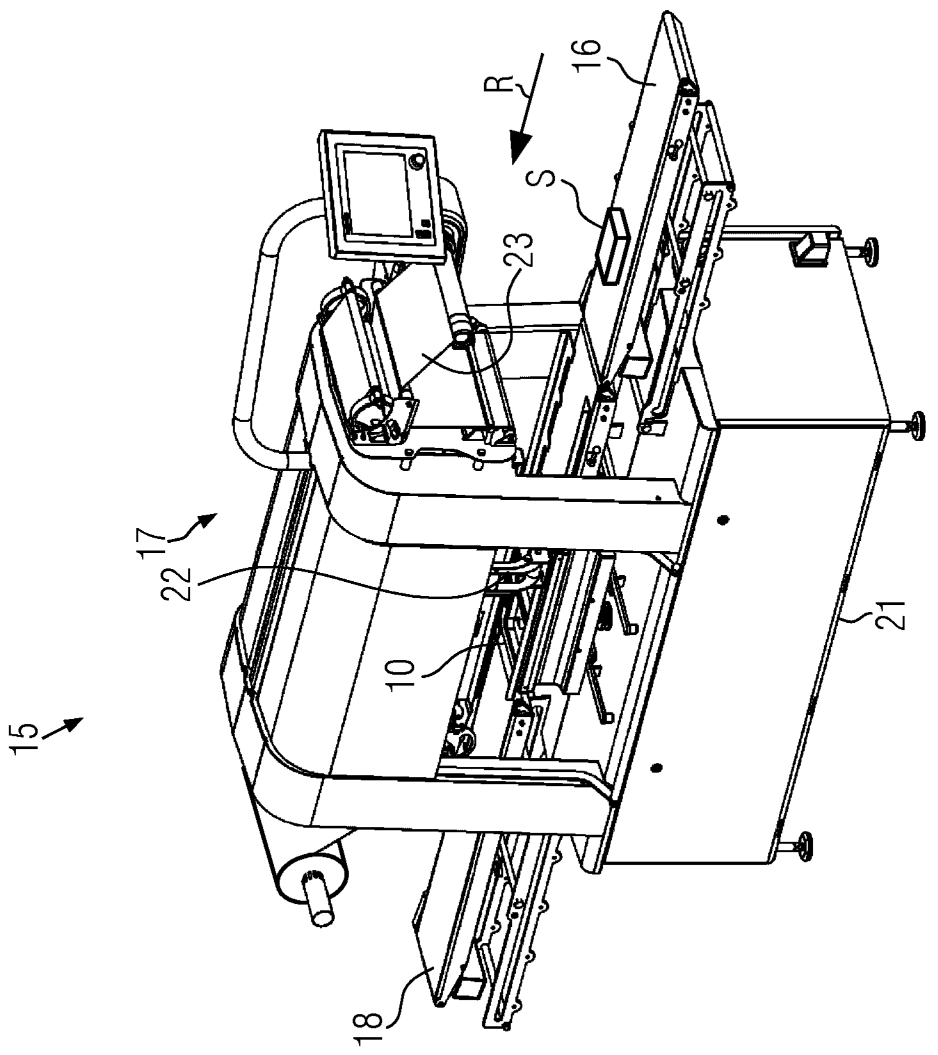
FIG. 2 shows a perspective view of a tray sealer.

FIG. 2 shows a tray sealing machine 15 which is also referred to as tray sealer among experts. Tray sealer 15 comprises a feed belt 16, a sealing station 17, and a discharge belt 18, which are arranged in direction of transport R in this order on a machine frame 21. Furthermore, tray sealer 15 comprises a gripper device 22 which is configured to transport trays S that are transported by way of feed belt 16 into sealing station 17 for a sealing process. Trays S transported into sealing station 17 are sealed with a top film 23 and thereafter transported by way of gripper device 22 onto discharge belt 18 for being transported away.

Figure 3:
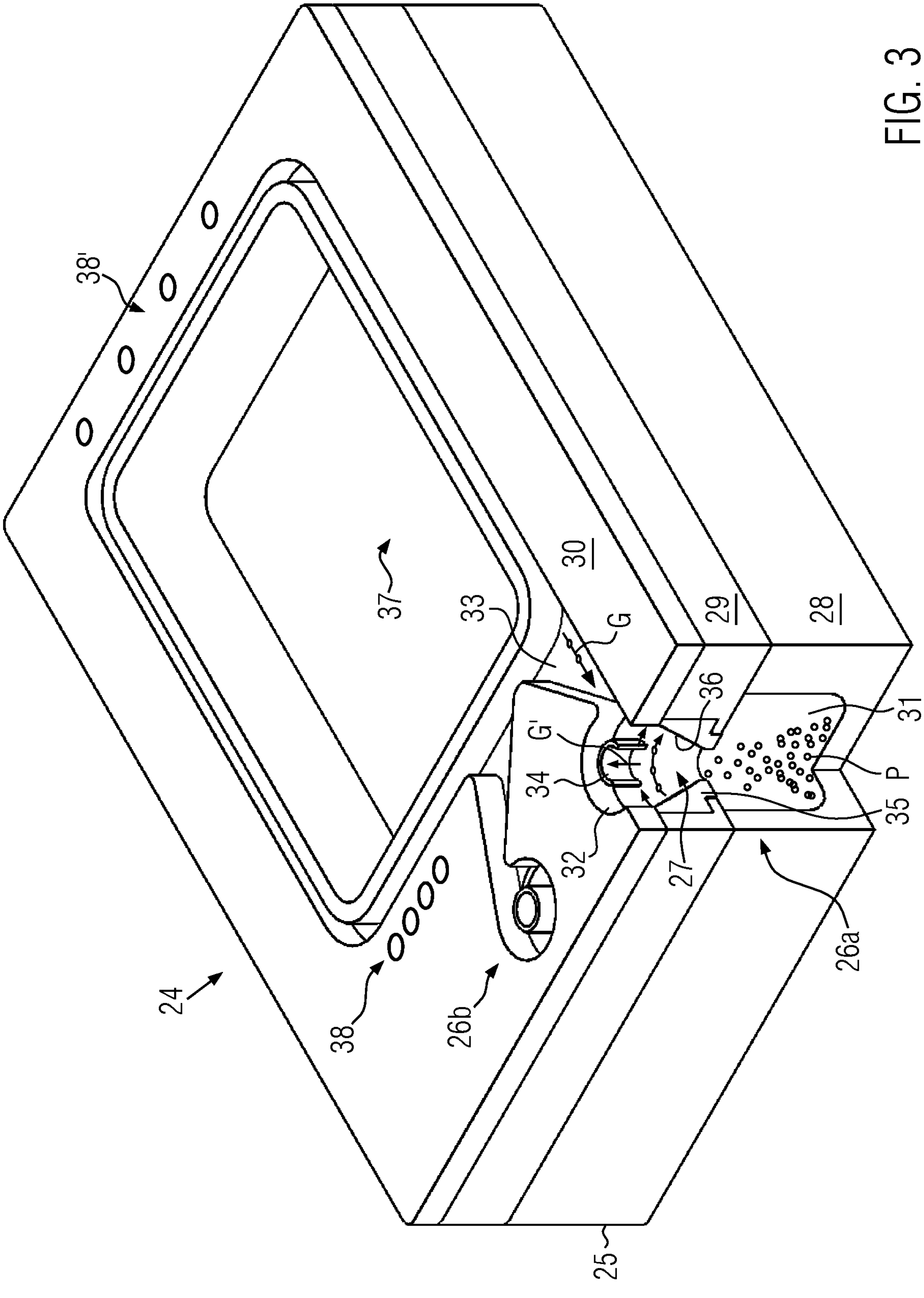
FIG. 3 shows a perspective view of a sealing tool according to the disclosure.

FIG. 3 shows a sealing tool 24 (presently without the tool upper part). Sealing tool 24 comprises a tool lower part 25 which can be employed at a packaging machine, in particular at sealing station 3 of deep-drawing packaging machine 1 from FIG. 1 or at sealing station 17 of tray sealer 15 from FIG. 2.

Tool lower part 25 comprises a first and a second centrifugal separator 26*a*, 26*b*. However, just a single centrifugal separator 26*a*, 26*b* could just as well be formed at tool lower part 25.

A corner region has been cut out at tool lower part 25 in FIG. 3 for improved illustration of centrifugal separator 26*a*. First centrifugal separator 26*a* and second centrifugal separator 26*b* can have a substantially identical structure. That is explained in more detail hereafter with reference to first centrifugal separator 26*a*.

Centrifugal separator 26*a* is configured as a tangential cyclone separator 27 according to FIG. 3. Tool lower part 25 comprises a first plate 28, a second plate 29, and a third plate 30. Plates 28, 29, 30 are assembled in a stacked manner, where centrifugal separator 26*a*, just like centrifugal separator 26*b*, is configured to be integrated within plates 28, 29, 30.

Centrifugal separator 26*a* comprises a particle collection container 31 which is formed in first plate 28. Particle collection container 31 is produced as a milled recess in first plate 28. Furthermore, centrifugal separator 26*a* comprises an inlet cylinder 32 and an inlet 33 which tapers towards inlet cylinder 32. Both inlet cylinder 32 as well as inlet 33 are formed in third plate 30. An extraction pipe 34 is arranged within inlet cylinder 32.

FIG. 3 also shows that centrifugal separator 26*a* provides a cylindrical insert 35 that is built into second plate 29 and that has a conical separation section 36 for a particle-laden gas flow G. Furthermore, FIG. 3 shows a pure gas flow G' which no longer contains any particles P and which leaves the centrifugal separator 26*a* via extraction pipe 34.

Inlet 33 of centrifugal separator 26*a* is associated with a tray receptacle 37 of tool lower part 25. Tray receptacle 37 is configured to receive a deep-drawn depression or a prefabricated tray S therein. Furthermore, FIG. 3 shows that extraction openings 38 are provided in third plate 30 adjacent to two centrifugal separators 26*a*, 26*b*. When sealing tool 24 is closed, a vacuum can be generated therewithin via extraction openings 38.

For evacuating sealing tool 24, the latter could also do without extraction openings 38. This means that the air mass extracted to create a vacuum inside sealing tool 24 flows completely through both centrifugal separators 26*a*, 26*b*.

As furthermore shown in FIG. 3, formed on a side of tool lower part 25 disposed opposite to extraction openings 38 are gas flush openings 38'. Replacement gas can be blown into sealing tool 24 through the former. Extraction openings 38 shown in FIG. 3 can be used for an evacuation process and gas flush openings 38' for a gas flushing process at sealing tool 24.

Figure 4:
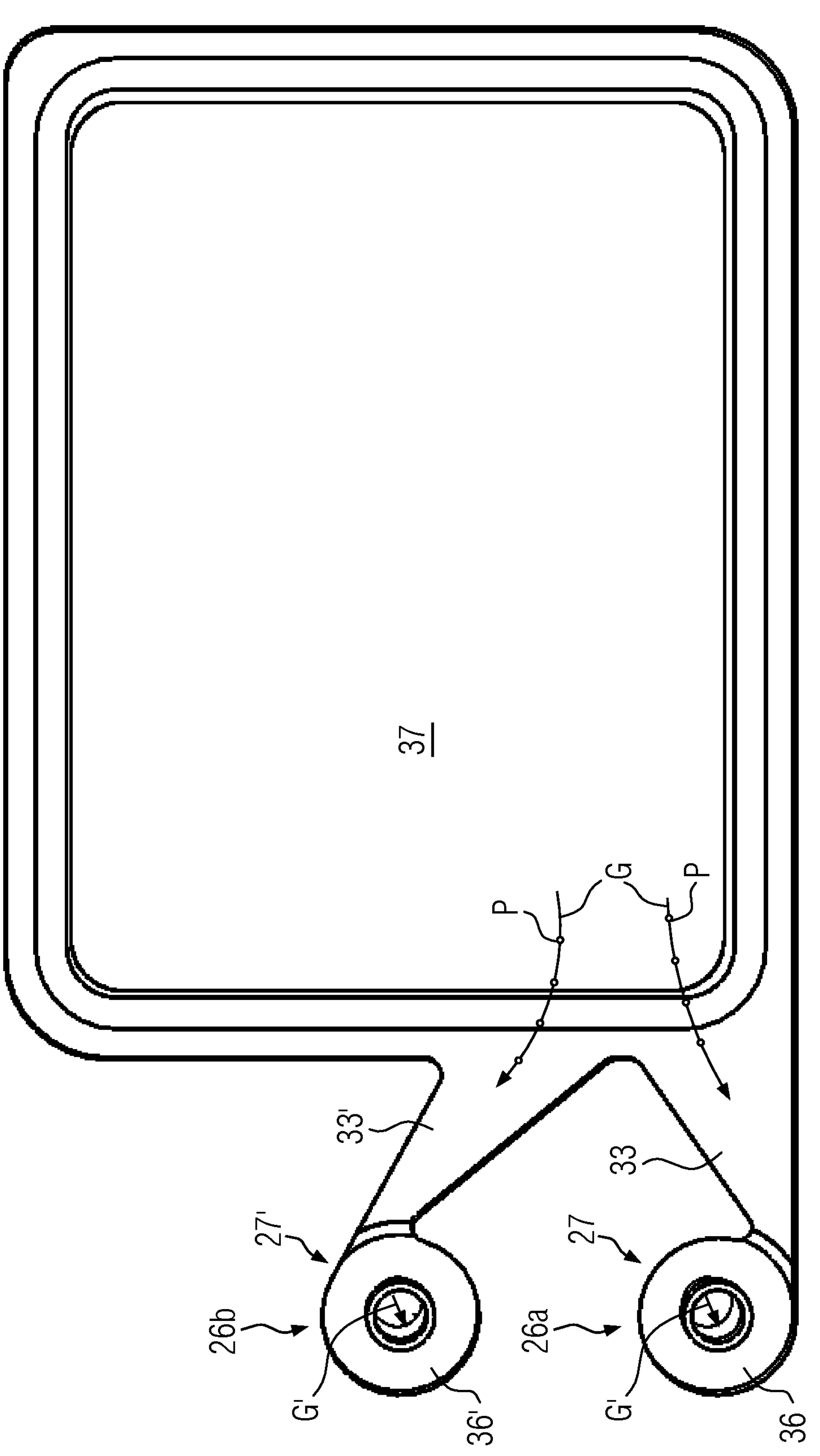
FIG. 4 shows a top view of the sealing tool according to the disclosure.

FIG. 4 shows tool lower part 25 in a top view. FIG. 4 shows that both centrifugal separators 26*a*, 26*b* are configured adjacent to one another as tangential cyclone separators 27, 27'. Inlet 33 of first centrifugal separator 26*a* and an inlet 33' of second centrifugal separator 26*b* open towards tray receptacle 37 with an increasing cross section. A gas flow G laden with particles P can be extracted therewith via two inlets 33, 33', be cleaned, i.e., separated, within respective conical separating sections 36, 36', and can leave respective centrifugal separator 26*a*, 26*b* as a particle-free gas flow G', possibly be blown back into tool lower part 25, or leave the latter directly through extraction openings 38.

Figure 5:
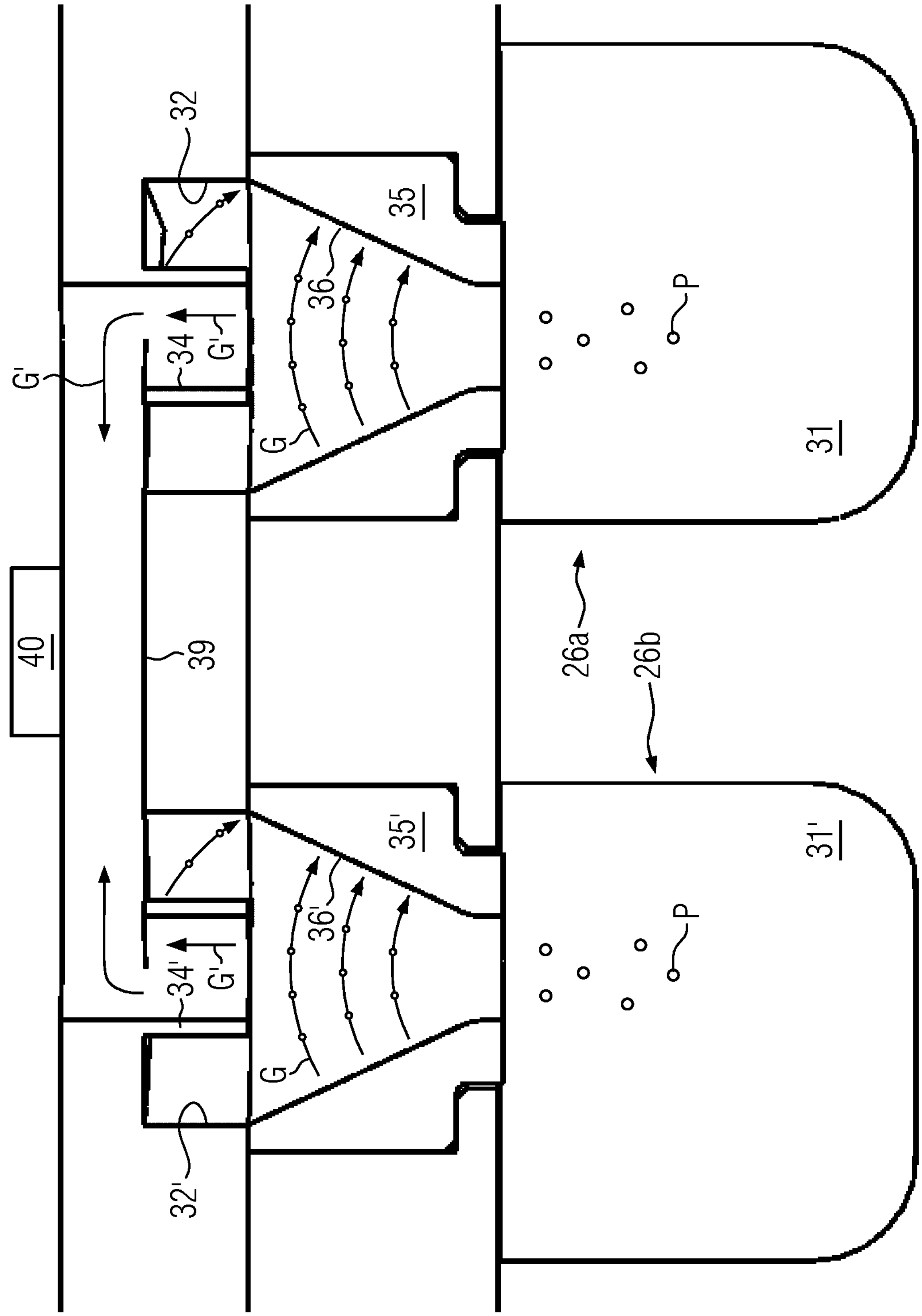
FIG. 5 shows an enlarged sectional illustration of two centrifugal separators formed adjacent to one another at the sealing tool.

FIG. 5 shows two centrifugal separators 26*a*, 26*b* in a sectional illustration. The two centrifugal separators 26*a*, 26*b* are connected by way of a common extraction duct 39. Respective extraction pipes 34, 34' are connected to extraction ducts 39. Both centrifugal separators 26*a*, 26*b* are driven by way of a schematically illustrated pump 40, which can primarily also be used to carry out an evacuation process.

What is claimed is:

1. A packaging machine, formed as a tray sealer or a deep-drawing packaging machine, comprising a sealing tool for the packaging machine, wherein the sealing tool comprises a tool lower part with at least one centrifugal separator for separating a particle-laden gas flow.

2. The packaging machine according to claim 1, wherein the centrifugal separator is configured as a tangential cyclone separator.

3. The packaging machine according to claim 1, wherein the centrifugal separator comprises an inlet cylinder and an inlet which tapers towards the inlet cylinder.

4. The packaging machine according to claim 3, wherein the inlet is associated with a tray receptacle of the tool lower part.

5. The packaging machine according to claim 1, wherein the tool lower part comprises at least one extraction duct.

6. The packaging machine according to claim 1, wherein the tool lower part comprises at least one gas flushing duct.

7. The packaging machine according to claim 1, wherein the tool lower part comprises a particle collection container for the centrifugal separator.

8. The packaging machine according to claim 1, wherein the tool lower part comprises several centrifugal separators.

9. The packaging machine according to claim 1, wherein the centrifugal separator at the tool lower part is configured to separate a particle-laden gas flow blown through the former and/or to separate a particle-laden gas flow sucked through the former.

10. The packaging machine according to claim 1, wherein the centrifugal separator can be connected to a pump that can be employed at the tool lower part for atmosphere exchange.

11. The packaging machine according to claim 1, wherein the tool lower part is assembled from several plates disposed one above the other in a stack-like manner, and wherein the centrifugal separator is formed to be integrated within at least two plates that are disposed one above the other.

12. The packaging machine according to claim 1, wherein the centrifugal separator comprises a cylindrical insert built into the tool lower part and having a conical separation section for the particle-laden gas flow.

13. A method for separating a particle-laden gas flow at a sealing tool of a packaging machine, wherein the particle-laden gas flow is separated by way of a centrifugal separator provided at a tool lower part of the sealing tool.

14. The method according to claim 13, wherein the centrifugal separator is operated with a pump that can be employed at the tool lower part for atmosphere exchange.

15. A sealing tool for a packaging machine, wherein the sealing tool comprises a tool lower part with at least one centrifugal separator for separating a particle-laden gas flow, wherein the tool lower part is assembled from several plates disposed one above the other in a stack-like manner, and wherein the centrifugal separator is formed to be integrated within at least two plates that are disposed one above the other.

16. The sealing tool according to claim 15, wherein the centrifugal separator is configured as a tangential cyclone separator.

17. The sealing tool according to claim 15, wherein the centrifugal separator comprises an inlet cylinder and an inlet which tapers towards the inlet cylinder.

18. The sealing tool according to claim 17, wherein the inlet is associated with a tray receptacle of the tool lower part.

19. The sealing tool according to claim 15, wherein the tool lower part comprises at least one extraction duct.

20. The sealing tool according to claim 15, wherein the tool lower part comprises at least one gas flushing duct.

* * * * *